Nov. 26, 1963  K. F. ROSS  3,112,355
WIDE-ANGLE CATOPTRIC SYSTEM
Filed Nov. 3, 1959  2 Sheets-Sheet 1

INVENTOR:
Karl F. Ross

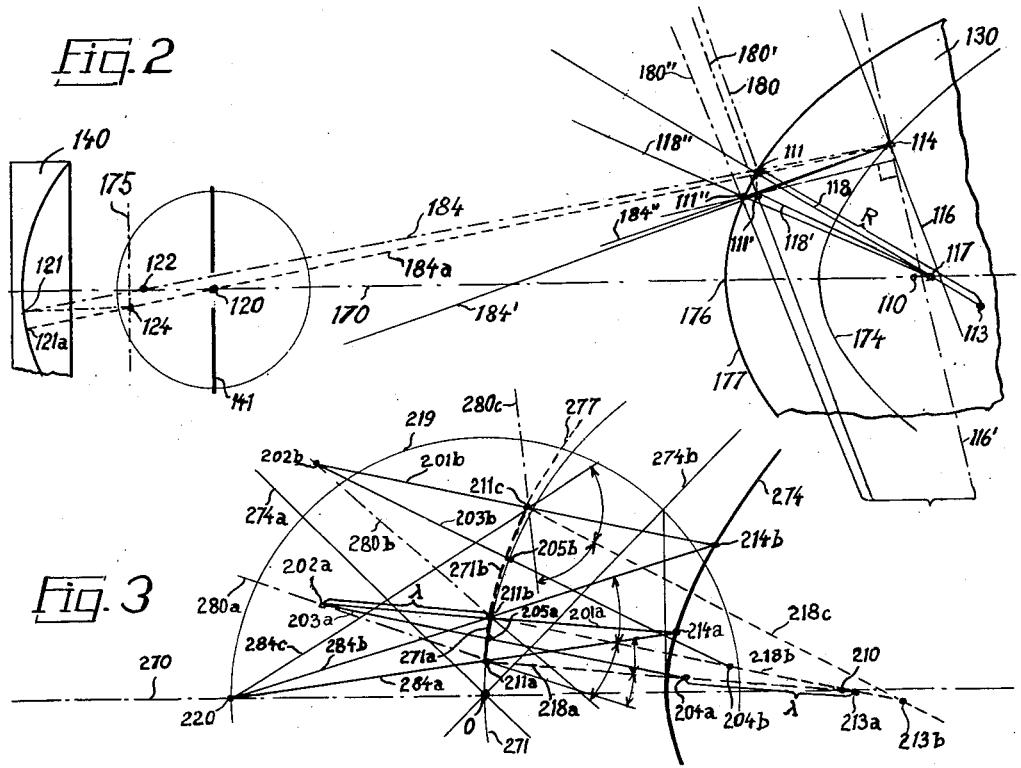
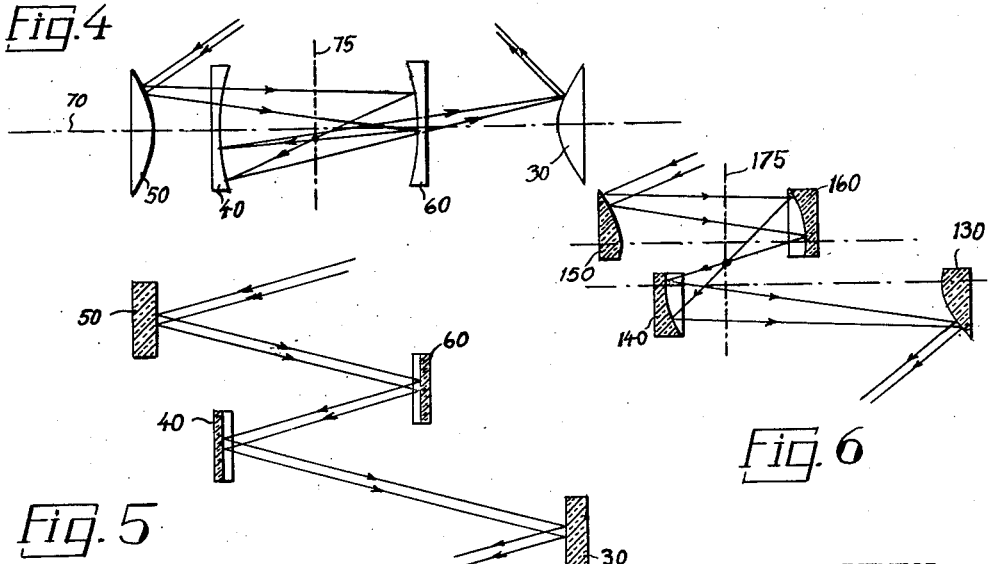

United States Patent Office 3,112,355
Patented Nov. 26, 1963

3,112,355
WIDE-ANGLE CATOPTRIC SYSTEM
Karl F. Ross, 5121 Post Road, Riverdale, N.Y.
Filed Nov. 3, 1959, Ser. No. 850,628
8 Claims. (Cl. 88—57)

My present invention relates to catoptric systems having two or more reflecting surfaces for controlling the path of light rays.

In my co-pending application Ser. No. 783,538, filed December 29, 1958, now Patent No. 2,970,518, issued February 7, 1961, I have disclosed an optical system of this character in which a concave and a convex catoptric element, each with a reflecting surface of circularly arcuate cross section, are combined into a pair adapted to form an image of a remote object on a plane which passes at a distance from the concave surface less than its radius but greater than half this radius. By so positioning two such catoptric pairs that their image planes coincide, I am able to provide an afocal system with centrally symmetrical magnification (in the case of spherical mirrors) or with anamorphotic effect (if cylindrical mirrors are used).

The focusing action of a catoptric pair as described above is due to the fact that the image of a straight line segment, located within the focal circle of a circularly concave mirror between its surface and its center, is a hyperbola whose vertical osculatory circle has a radius equal to half the mirror radius; thus, if a circularly convex mirror of the same radius as the concave mirror is positioned concentrically with this osculatory circle, the latter becomes the virtual image of an infinitely distant linear object reflected in the convex mirror whereby a real image of the object is formed on the aforementioned line segment. For objects located at a finite distance from the convex mirror it is necessary to reduce the radius of the latter and to depart from concentricity unless the object itself is curved.

Accurate focusing with a system of this type will be possible, however, only in a field which is centered upon the common axis of the two mirrors and is angularly limited by the extent to which the image hyperbola follows its osculatory circle. My present invention has for its object the provision of a catoptric system of the same general character which is operative over a substantially increased field angle.

The focusing action of a circularly curved mirror devolves from the fact that each arc segment of the mirror surface osculates a conic section whose axis passes through the center of curvature of the mirror. In the case of parallel rays (telecentric beam) this conic section is a parabola; with divergent or convergent rays the conic section is an ellipse or a hyperbola, respectively. Since osculation occurs only in the vicinity of the axis of the conic section, accurate focusing will be attainable only for a beam centered upon a principal ray which passes through the center of curvature of the mirror. Although there exists one principal ray for each direction of incidence, only a single ray (or, in the case of cylindrical mirrors, a single sheet of rays) passes through the centers of both mirrors.

In accordance with the present invention I provide the convex one of the two conjugate mirrors with a reflecting surface of non-circular cross section so calculated that every point of this surface lies on an arc osculating a conic section whose focal point lies on a hyperbola which is the image of a straight line segment as reflected by the concave mirror, the point on the reflecting surface and the associated focal point on the hyperbola being substantially aligned with the center of the concave mirror. If the alignment is exact, any given point on the line segment will lie on a straight line which passes through the center of the concave mirror, thus representing a principal ray for that mirror, and intersects the image hyperbola at the focal point of a conic section osculating the surface of the convex mirror at the point of incidence of that ray so that the reflection of the ray at that surface will in turn be a principal ray of the convex mirror. Stated differently, a bundle of rays impinging upon the convex mirror at like angle will include a principal ray whose reflection passes through the center of curvature of the concave mirror, a beam centered on this principal ray being thus sharply focused in a point located on the aforementioned straight-line segment.

The family of conic sections osculating the convex reflecting surface will be parabolas if the external rays terminating at that surface (as distinct from the internal rays passing between the two mirrors) are parallel; this will be the usual case in a telescopic or anamorphotic system. If an object or an image plane is located at a finite distance from the convex surface, or if a dispersive system is inserted in the path of the external rays, the latter will form diverging beams and the conic sections will be ellipses; with converging beams, e.g. in the presence of a collective system, they will be hyperbolas. With increasing distance of the reflecting point from the vertex of the convex mirror, the axis of the associated conic section will be progressively more inclined with respect to the common axis of the two mirrors while its curvature grows progressively flatter; at the limit its center of curvature moves toward infinity.

In some instances it will be desirable to have the principal rays from the convex mirror intersect not at the exact center of the concave mirror but at some point in its vicinity, preferably one nearer to the mirror surface. Such an arrangement will slightly reduce the sharpness of focus in the neighborhood of the principal ray of the concave mirror (which now no longer coincides with a principal ray of the convex mirror) but will broaden, to some extent, the focusable-beam width, i.e. the area on the convex mirror from which rays having a given direction (or converging at a given outside point) will be reflected to intersect in one point on the image plane of the mirror pair; this allows the use of larger diaphragm apertures to widen the bundle of rays passing between the two mirrors, thus resulting in a brightening of the projected image.

The invention will be described in greater detail with reference to the accompanying drawing in which:

FIG. 2 is a view similar to FIG. 1, showing a somewhat modified system according to the invention;

FIG. 3 is a further diagrammatic view illustrating a graphic method of plotting the surface of a convex mirror according to the invention;

FIG. 4 is a top plan view of an anamorphotic system incorporating two catoptric pairs as shown in FIG. 1;

FIG. 5 is a sectional elevational view of the system shown in FIG. 4; and

FIG. 6 is a view similar to FIG. 5 but illustrating the application of the invention to a spherically effective system.

Figure 1:
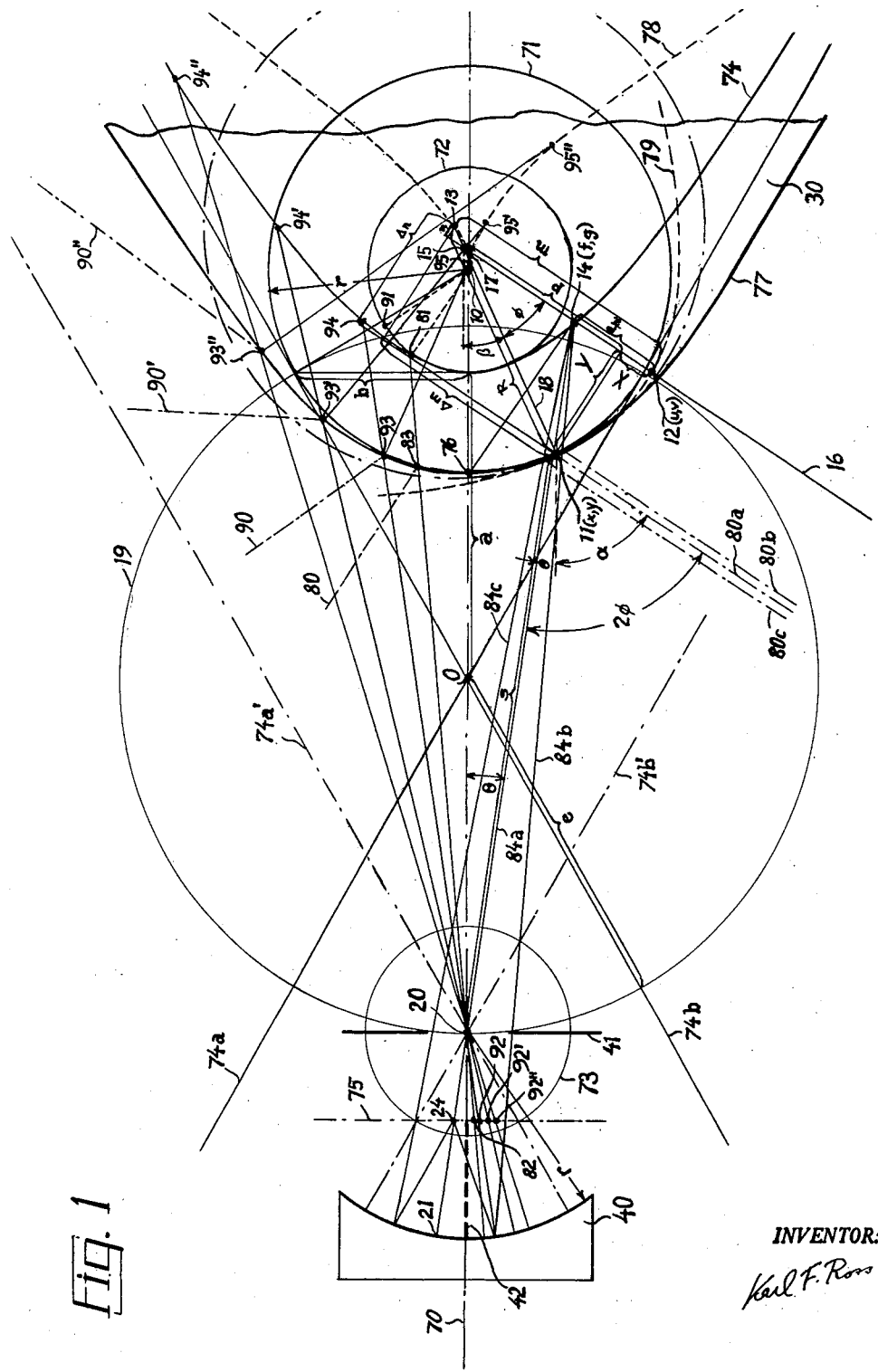
FIG. 1 is a diagrammatic view of a catoptric pair according to the invention, used to explain the theoretical concepts involved.

In FIG. 1 there are shown a convex mirror 30 and a concave mirror 40 which for purposes of the following discussion may be assumed to be cylindrical. The two mirrors share a common axial plane 70 on which there is located the cylinder axis 20 representing the center of curvature of the circularly arcuate reflecting surface of concave mirror 40. The reflecting surface of convex mirror 30, whose generatrix follows a law to be developed hereinafter, osculates, in the vicinity of plane 70, a circular cylinder 71 whose axis is shown at 10 and whose radius r equals that of mirror 40.

In the following analysis it will be convenient to consider only a single cross section of the various cylindrical bodies 30, 40, 71 etc. shown in FIG. 1 and to refer to them as curves; similarly, plane 70 will be regarded as a line and axes 10, 20 as points on this line.

Centered on the points 10 and 20 are two circles 72, 73 of radius $r/2 = b^2/a$ where $a$ and $b$ are the half-axes of a hyperbola 74 which constitutes the image of a line 75 as reflected by mirror 40. Line 75 is perpendicular to axis 70 and intersects the circle 73 between mirror 40 and its center 20; as explained in my aforementioned Patent No. 2,970,518, the distance of line 75 from center 20 determines the location of the center O of hyperbola 74, as well as the magnitude of its axes $a$ and $b$, without affecting the ratio $b^2/a$ which represents the radius $r/2$ of its osculatory circle 72 and is always equal to the radius of the focal circle 73 of the concave mirror 40. In practice, this distance should be not less than $r/4$ since at that value the vertex 76 of mirror 30 approaches so close to mirror 40 as to coincide with point 20. The asymptotes 74a, 74b of the hyperbola are parallel to the sides of a triangle defined by point 20 and by the intersections between line 75 and circle 73.

In the vicinity of its vertex 76 the reflecting surface of mirror 30 hugs the circle 71, hence for rays incident at points close to that vertex the system functions in the same manner as that described in my Patent No. 2,970,518. Thus, a beam of parallel rays having the direction of a ray 80, incident upon the vertical region of mirror 30, has as its imaginary focus a point 81 which lies on a portion of circle 72 hugging the hyperbola 74, the image of point 81 upon reflection by mirror 40 being a point 82 on line 75. The radius 10—81 is parallel to ray 80 and substantially coincides with the axis of a parabola osculating the circle 71, and therefore also the reflecting surface of mirror 30, at the point of incidence 83.

If, however, the angle of incidence is increased as shown for the ray 90, the associated parabola axis intersects the circle 72 at a point 91 which no longer lies on the hyperbola 74 and whose image, therefore, does not fall upon the line 75. Moreover, at the point of incidence 93 the circle 71 departs to such an extent from a parabola having a focus at point 91 that a beam of rays parallel to ray 90 will not be sharply focused in that point.

The curve 77, which defines the convex reflecting surface of mirror 30, is so laid out that in the region of point 93 it osculates a parabola having the focal point 94, this latter point representing the intersection of hyperbola 74 with the produced line 20—93. Thus a beam of parallel rays incident at 93, and having the direction of ray 90, will be sharply focused in point 94 which, being on the hyperbola 74, has an equally sharp image at 92, i.e. at the point where the principal ray through the center 20 of mirror 40 intersects the line 75. In similar manner, beams coming from directions represented by rays 90', 90" will have a virtual focus at 94', 94" and a real image at 92', 92", respectively.

At 95, 95', 95" I have shown the locations of the centers of curvature of portions of curve 77 in the vicinity of the points of incidence 93, 93', 93" of rays 90, 90', 90", respectively. It will thus be seen that the center of curvature moves outwardly toward infinity along a curve 78 having a cusp at the point 10. Curve 77, the involute of curve 78, thus becomes progressively flatter with increasing distance from its vertex 76, its radius of curvature being infinite at its intersections with terminal rays 74a', 74b' which are parallel to the asymptotes 74a and 74b.

Consider a point 11 on curve 77, a bundle of parallel rays 80a, 80b, 80c impinging upon the curve in the vicinity of that point, and a parabola 79 osculating the curve 77 at the point 11. Parabola 79 has an axis 16 on which there are located the vertex 12, the focal point 14 representing the intersection of that axis with hyperbola 74, and a point 15 whose distance from vertex 12 equals the parameter $p$ of the parabola and which lies on the radius 18 (of magnitude R) between point 11 and the associated center of curvature 13, at a location above the intersection 17 between axes 16 and 70.

Ray 80a, which impinges directly upon point 11, is reflected by curve 77 along a line 84a which passes through the center 20 of mirror 40 and thus constitutes a principal ray of that mirror. Ray 84a, which is reflected in itself at 21 by the mirror 40, intersects the line 75 at a point 24 constituting the image of the beam 80a, 80b, 80c; the reflections 84b, 84c of rays 80b, 80c converge in point 24.

The inner rays of the beam, i.e. those impinging between point 11 and vertex 76 as particularly illustrated for the ray 80c, undershoot the center 20 when reflected by mirror 30 as indicated at 84c; the outer rays such as ray 80b, impinging beyond the principal ray 80a, overshoot the center 20 when reflected as shown at 84b. The extent to which these overshot and undershot rays are permitted to be reflected by mirror 40 is controlled by a diaphragm 41 and, if desired, by a shield 42 which, lying within axial plane 70, cuts off some of the overshot rays without limiting the spread of the undershot rays. This is desirable because the system is more astigmatic for the outer rays 80b than for the inner rays 80c. Thus, the inner rays impinge upon a portion of curve 77 deviating toward the right from parabola 79 so that the internal ray 84c seems to come from a point of hyperbola 74 which is lower than point 14 and has an image on line 75 above point 24; at the point where the ray 84c strikes the surface of mirror 40, however, this surface curves toward the interior of its osculating parabola so as to tend to reflect the ray toward a lower point on line 75, thereby compensating for the aberration introduced by the curve 77. In the case of the outer rays, on the other hand, the aberrations are additive and tend to deflect the internal ray 84b toward a point lying above image point 24. The presence of a shield 42, which of course can be used only in a cylindrical system, reduces the coma due to these outer rays while permitting the use of a larger aperture at the diaphragm 41 controlling the inner rays.

In FIG. 2, in which the cylindrical mirrors 30, 40 of FIG. 1 have been replaced by mirrors 130, 140 whose reflecting surfaces are surfaces of revolution about the axis 170, I have illustrated a modification of the generatrix of the convex mirror so calculated that the point of incidence 111 of a ray 180, at which the curve 177 has a center of curvature 113 and osculates a parabola with focal point 114, defines with this point 114 an internal-ray path 184 which no longer passes through the center 120 of the concave mirror 140 but intersects the axis 170 at a point 122 to the left of that center. Ray 184 is reflected at 121 toward the image 124 of point 114 on plane 175; the two points 124, 114 define the path of a principal internal ray 184a which passes through the center 120. Ray 184a impinges upon the periphery of curve 177 at a point somewhat below point 111, thus at a location where conditions are favorable for sharp focusing as previously noted. The leftward shifting of the locus of intersection of the reflections of the principal external rays, i.e. the displacement of this locus from point 120 to point 122, reduces the number of overshot rays passing through diaphragm 141 while increasing the number of undershot rays, the latter in this instance including the principal internal ray 184a which is reflected in itself at 121a. Thereby the system is rendered less astigmatic and greater diaphragm apertures can be used to increase the brightness of the image.

Whereas in the cylindrical system of FIG. 1 we were concerned only with meridional rays, it behooves in the centrally symmetrical system of FIG. 2 to investigate the behavior of sagittal light rays as well. Let the point 111', randomly chosen on the latitude of point 111, be the point of impingment of an external sagittal ray 180' whose direction is such as to give rise, upon reflection at mirror 130, to an internal ray 184′. The radius of curvature 118′ from point 111′ passes through the intersection 117 between the radius 118 of point 111 and the axis 170. Point 117 and ray 184′ define a plane having a trace 116′ in the meridional plane (i.e. the plane of the paper), this trace 116′ extending at an acute angle to the parabola axis 116 which is parallel to the principal ray 180. If the point 111′ is rotated about the trace 116′ into the meridional plane, it occupies the position 111′ and together with focal point 114 defines the rotated internal sagittal ray 184″. The rotated internal radius 118″, defined by points 111″ and 117, bisects the angle between rotated internal ray 184″ and rotated external ray 180″. If the latter is extended to intersect the trace 116′, the point of intersection lies in the meridional plane and also on the external ray 180′ which will thus be seen to be substantially parallel to ray 180. It should be noted that in the substantially spherical region of mirror 130 in the vicinity of its vertex 176, where the points 113 and 117 coincide with the center 110 of the sphere, this parallelism becomes absolute. Thus, the system shown in FIG. 2 is operative for both meridional and sagittal rays.

In FIG. 3 I have illustrated a method of graphically plotting a curve 277 each point of which, as is the case with curve 77 of FIG. 1, is to lie on a parabola having a focus in line with the point and the mirror center 220, this focus also lying on a hyperbola 274 having a center O, a focal circle 219 centered on point O and passing through point 220, and an osculatory circle whose center 210 is found as the intersection of axis 270 with a line tangent to circle 219 at its intersection with asymptote 274a or 274b. Whereas, however, in FIG. 1 the ratio $b:a$ of the hyperbola axes had been chosen as $1:\sqrt{3}$, corresponding to an inclination of 30° for the asymptotes, this ratio in FIG. 3 is equal to unity, with the asymptotes inclined at 45° to the axis 270 and with the point O coinciding with the vertex (76 in FIG. 1) of the curve 277 which at that point osculates a circle 271 centered on point 210 and having a radius double that of the osculatory circle of hyperbola 274 concentric therewith. It should be noted, however, that the method about to be described is applicable to any asymptote angle less than 60°, a value (corresponding to an axial ratio $b:a=\sqrt{3}:1$) at which vertex 76 coincides with point 20.

Starting with the circle 271, the hyperbola 274 and the point 220, we select on the circle a point 211a close to the axis 270 and draw a line 284a through points 220 and 211a, this line intersecting the hyperbola 274 at 214a. Next, the radius 218a is drawn through points 210 and 211a, this radius bisecting the angle between the internal ray 284a and an external ray 280a, incident at point 211a, which can thus be plotted. From point 214a we draw a line 201a, which for convenience should be parallel to radius 218a, intersecting the ray 280a at 202a; the bisector 203a of the angle between lines 280a and 201a gives the direction of the perpendicular to curve 277 at the point 211b where the line 201a intersects the curve 277. Point 211b, whose location has not yet been determined, lies close to the perimeter of circle 271 and, in first approximation, may be assumed to represent the intersection of that circle with line 201a; more accurately, however, point 211b is found by intersecting the bisector 203a with the radius 218a at 204a, drawing an arc centered on point 204a through point 211a to intersect the bisector 203a at 205a, and producing the chord through points 211a, 205a to intersect the line 201a at 211b. Finally, the distance λ between points 202a and 211b is laid off from point 204a on radius 218a to give the center of curvature 213a for curve 277 at point 211b.

The process is now repeated by drawing a circular arc 271a around center 213a through points 211a, 211b as a continuation of curve 277 between these points, producing the external ray 284b from point 220 beyond point 211b to find the point 214b on hyperbola 274, plotting the radius 218b, the external ray 280b and, parallel to radius 218b, the line 201b, finding the points 202b, 204b, 205b all lying on bisector 203b, and producing the chord 211b—205b to give a further point 211c on the curve 277, the distance between points 202b and 211c corresponding to the spacing of point 204b from the new center of curvature 213b on radius 218b. A further section of curve can now be drawn as a circular arc 271b, centered on point 213b and linking points 211b, 211c, it being thus possible to construct the entire curve 277 as a succession of arcs 271, 271a, 271b etc. The external principal ray incident at point 211c is shown at 280c, the angle between this ray and the internal ray 284c being bisected by the perpendicular 218c representing the radius of curvature at that point.

It will be understood that the method described in connection with FIG. 3 is equally applicable to the construction of a curve such as the one shown at 177 in FIG. 2, the internal rays 284a, 284b etc. being in this case drawn not to a point 220 on circle 219 but through a point lying outside that circle on the axis 270.

In FIGS. 4 and 5 I have illustrated how a pair of mirrors 30 and 40, of the character shown in FIG. 1, can be combined with a similar pair of mirrors 50 and 60 to form an anamorphotic system with horizontal magnification. The four mirrors share a common axial plane 70, here assumed to be vertical, while being vertically staggered so that a beam of parallel light rays impinging from an infinitely remote external object (not shown) upon convex mirror 50 will be reflected toward spherically concave mirror 60, then focused in the common focal plane 75 of the two mirror pairs to form a semi-image of the object, thence directed by the spherically concave mirror 40 toward the convex mirror 30, and finally reconstituted by the latter into an outgoing beam of parallel rays enclosing with the axis 70 an angle greater than that of the incident beam. Naturally, the path of rays could also be reversed, as assumed in the discussion of FIG. 1. Mirrors 40 and 60 may have the same radius of curvature, with mirror 50 differing from mirror 30 to the extent dictated by the fact that plane 75 intersects the focal cylinders of the two concave mirrors at different distances from their respective axes.

FIG. 6 shows two circularly symmetrical mirror pairs 130, 140 and 150, 160, each similar to the pair 130, 140 of FIG. 2, which are disposed in essentially the same manner as the mirrors in FIGS. 4 and 5 so as to share a common focal plane 175.

A mathematical analysis of the curve 77 will now be given as a representative example of the various convex optical surfaces envisaged by the present invention.

Let the parabola 79 be defined by its coordinates X, taken along axis 16 as abscissa, and Y, perpendicular thereto, so that $Y^2=2pX$. Let, furthermore, the points 11, 12 and 14 have the horizontal and vertical coordinates $(x, y)$, $(u, v)$ and $(f, g)$ respectively, with point 20 as the origin. Let $\theta$ be the angle enclosed by the principal internal ray 84a and axis 70, α the corresponding angle of external ray 80a, β that of radius 18 (the surface normal at point 11), and φ the angle of incidence between this radius and either of the two correlated rays 80a, 84a. The following relationships will then obtain:

$$u-x=-X\cos\alpha+Y\sin\alpha$$
$$v-y=X\sin\alpha+Y\cos\alpha$$
$$y=x\tan\theta=x\tan(2\phi-\alpha)$$
$$Y=p\tan\phi$$
$$X=\frac{Y^2}{2p}=\frac{p}{2}\tan^2\theta$$

whence $$x=u+\frac{p}{2}(\tan^2\phi\cos\alpha-2\tan\phi\sin\alpha) \quad (1a)$$

$$y=v-\frac{p}{2}\tan^2\phi\sin\alpha+2\tan\phi\cos\alpha) \quad (1b)$$

Let $e=\sqrt{a^2+b^2}$ represent the radius of the focal circle 19 of hyperbola 74, this circle passing through the origin 20 of the principal coordinate system. Since $$u=f-\frac{p}{2}\cos\alpha$$

and $$v=g+\frac{p}{2}\sin\alpha$$

we can write $$x=f-\frac{p}{2}(\cos\alpha-\tan^2\phi\cos\alpha+2\tan\phi\sin\alpha)=f-\frac{p\cos\theta}{2\cos^2\phi} \quad (2a)$$

$$y=g+\frac{p}{2}(\sin\alpha-\tan^2\phi\sin\alpha-2\tan\phi\cos\alpha)=g-\frac{p\sin\theta}{2\cos^2\phi} \quad (2b)$$

The hyperbola 74, whose real and imaginary half-axes are $a$ and $b$, respectively, has the equation $$(f-e)^2/a^2-g^2/b^2=1$$

considering that $\tan\theta=g/f=y/x$, we find $$f=b^2\frac{e+a\sqrt{1+\tan^2\theta}}{b^2-a^2\tan\theta}=\frac{b^2x(ex+a\sqrt{x^2+y^2})}{b^2x^2-a^2y^2} \quad (3a)$$

$$g=\frac{b^2y(ex+a\sqrt{x^2+y^2})}{b^2x^2-a^2y^2} \quad (3b)$$

Let $m$, $n$ be the coordinates of center of curvature 13 with axis 16 taken again as the abscissa. The well-known formulas for the center of curvature yield $$m=p+3X$$
$$\Delta m\equiv m-X=p+2X$$
$$n=\frac{Y^3}{p^2}$$
$$\Delta n\equiv Y+n=Y(p+2X)/p$$

The radius of curvature R for the parabola can thus be computed as $$R=\sqrt{\Delta m^2+\Delta n^2}=p/\cos^3\phi$$

and must also satisfy the formula for the radius of curvature of the function $y(x)$, i.e.

$$R=-(1+y'^2)^{\frac{3}{2}}/y''$$

with $$y'\equiv\frac{dy}{dx}=\cot(\alpha-\phi)\equiv\cot(\phi-\theta)\equiv\cot\beta$$

Substituting, we obtain $$p=R\cos^3\phi=-(xy'-y)^3/y''\sqrt{(x^2+y^2)^3} \quad (4)$$

Now, from Equations 2a, 3a and 4, $$X=\frac{b^2x(ex+a\sqrt{x^2+y^2})}{b^2x^2-a^2y^2}+\frac{x(xy'-y)(y'^2+1)}{2y''(x^2+y^2)}$$

whence $$2y''(x^2+y^2)(b^2x^2-a^2y^2-eb^2x-ab^2\sqrt{x^2+y^2})$$
$$-(xy'-y)(y'^2+1)(b^2x^2-a^2y^2)=0 \quad (5)$$

It will be convenient at this point to shift from Cartesian to polar coordinates by introducing the distance $s$ between the points 20 and 11, with $$s\cos\theta=x \quad s\sin\theta=y$$

$$\frac{s'\sin\theta+s\cos\theta}{s'\cos\theta-s\sin\theta}=y' \quad \frac{2s'^2-ss''+s^2}{(s'\cos\theta-s\sin\theta)^3}=y''$$

where $$s'\equiv\frac{ds}{d\theta} \quad s''\equiv\frac{d^2s}{d\theta^2}$$

Equation 5 now becomes $$s'^2[3s(e\cos\theta-a)-4b^2]-2ss''[s(e\cos\theta-a)-b^2]$$
$$+s^2[3s(e\cos\theta-a)-2b^2]=0 \quad (6)$$

Let $K\equiv\cos\theta_{max}=a/e$, $t\equiv\tan\theta/2$, $$\dot{s}\equiv\frac{ds}{dt},\ \ddot{s}\equiv\frac{d^2s}{dt^2}$$

$\frac{1}{2}<K<1$.

Equation 6 may then be rewritten as follows:

$$2s\ddot{s}(1+t^2)^2\{s[(1-t^2)-K(1+t^2)]-e(1-K^2)(1+t^2)\}$$
$$-\dot{s}^2(1+t^2)^2\{3s[(1-t^2)-K(1+t^2)]$$
$$-4e(1-K^2)(1+t^2)\}+4s\dot{s}t(1+t^2)\{s[(1-t^2)$$
$$-K(1+t^2)]-e(1-K^2)(1+t^2)\}-4s^2\{s[(1-t^2)$$
$$-K(1+t^2)]-2e(1-K^2)(1+t^2)\}=0 \quad (7)$$

Equation 7 may be simplified by introducing $$T^2=\frac{1-K}{1+K}$$

where T, the maximum value of $t$, falls within the ranges $0<T<1/\sqrt{3}$; with $s_0=e(2K-1)(K+1)/K$ (for $t=0$), $s_0$ being the distance 20—76, we obtain $$s(1-3T^2)\left(1-\frac{t^2}{T^2}\right)\{(2s\ddot{s}-3\dot{s}^2)(1+t^2)^2+4s[t\dot{s}(1+t^2)$$
$$-s)]\}=s_0(1-T^2)(1+t^2)\{(2s\ddot{s}-4\dot{s}^2)(1+t^2)^2$$
$$+4s[t\dot{s}(1+t^2)-2s]\} \quad (8)$$

The dependent variable $s$ of the polar coordinate system $s$, $\theta$ may now be expressed as a polynomial $$s=s_0+\frac{d^2s_0}{2dt^2}t^2+\frac{d^4s_0}{24dt^4}t^4+\frac{d^6s_0}{720dt^6}t^6+\cdots \quad (9)$$

according to Maclaurin's formula, the coefficients of the odd-numbered powers of $t$ being zero. The higher derivatives of $s$ at the point $t=0$ are found to have the following values:

$$\frac{d^2s_0}{dt^2}\equiv\ddot{s}_0=s_0\frac{1+T^2}{T^2}$$

$$\frac{d^4s_0}{dt^4}=6s_0\frac{1-T^4}{T^4}$$

$$\frac{d^6s_0}{dt^6}=-3s_0\frac{(1-T^4)(1-32T^2+27T^4)}{T^8}$$

substituting these values in Equation 9, we obtain:

$$s=s_0\left[1+\frac{1+T^2}{2T^2}t^2+\frac{1+T^4}{4T^4}t^4\right.$$
$$\left.-\frac{(1-T^4)(1-32T^2+27T^4)}{240T^8}t^6\cdots\right] \quad (10)$$

With $t\to T$, $s$ approaches its maximum S where the radius of curve 77 becomes infinite. For intermediate values of T (e.g. $T=\frac{1}{2}$), $S\approx 2s_0$.

Expressions similar to Equation 10 may, of course, be developed in analogous manner for the various modifications described above, i.e. for the case of diverging or converging beams and/or for situations in which the internal rays are to intersect at locations other than the secondary focus 20 of the image hyperbola 74.

I claim:
1. An optical system comprising a concave mirror of circularly arcuate cross section and a convex mirror with a reflecting surface of non-circular cross section coplanar with said arcuate cross section, said non-circular cross section at different substantially parabolic points osculating different conic sections whose focal points lie on a common hyperbola representing the image of a straight line as reflected by said concave mirror, said cross sections having a common axis perpendicular to said straight line, the lines interconnecting the points of said non-circular cross section with the focal points of the corresponding conic sections substantially intersecting one another at a common point located on said axis in the vicinity of said straight line, said non-circular cross section osculating a circle in the vicinity of said axis and extending outwardly from said axis for an appreciable distance beyond the region of osculation with said circle.

2. A system according to claim 1 wherein said common point substantially coincides with the center of said concave mirror.

3. A system according to claim 1 wherein said common point is located between the center and the surface of said concave mirror.

4. A system according to claim 1, further comprising diaphragm means extending transversely to said axis in line with said common point.

5. A system according to claim 1 wherein said mirrors are cylindrical with a common axial plane, further comprising shield means extending from the vertex of said concave mirror in said axial plane toward said common point.

6. A system according to claim 1 wherein said non-circular cross section is a curve substantially defined by the equation $$s'^2[3s(e\cos\theta - a) - 4b^2] - 2ss''[s(e\cos\theta - a) - b^2] + s^2[3s(e\cos\theta - a) - 2b^2] = 0$$

where $s$ represents the length of a line from a point of said curve to the center of said concave mirror, $a$, $b$ and $e$ being respectively the real half-axis, the imaginary half-axis and the radius of the focal circle of a hyperbola having a focal point at said center, said real half-axis coinciding with the axis of said concave mirror, and where $$s' \equiv ds/d\theta, \quad s'' \equiv d^2s/d\theta^2$$

7. An afocal objective system comprising two pairs of catoptric elements; each pair consisting of a concave mirror of circularly arcuate cross section and a convex mirror with a reflecting surface of non-circular cross section coplanar with said arcuate cross section, said non-circular cross section at different substantially parabolic points osculating different conic sections whose focal points lie on a common hyperbola representing the image of a straight line as reflected by said concave mirror, said cross sections having a common axis perpendicular to said straight line, the lines interconnecting the points of said non-circular cross section with the focal points of the corresponding conic sections substantially intersecting one another at a common point located on said axis in the vicinity of said straight line; said straight line being the same for both of said pairs, the concave mirrors of said pairs turning their concave sides toward each other, said non-circular cross section osculating a circle in the vicinity of said axis and extending outwardly from said axis for an appreciable distance beyond the region of osculation with said circle.

8. A system according to claim 7 wherein said conic sections are parabolas and said common point substantially coincides with the center of said concave mirror.

References Cited in the file of this patent

UNITED STATES PATENTS

| | | |
|---|---|---|
| 884,217 | Schuessler | Apr. 7, 1908 |
| 2,520,634 | Grey | Aug. 29, 1950 |
| 2,697,380 | Wyser | Dec. 21, 1954 |
| 2,819,404 | Herrnring et al. | Jan. 7, 1958 |
| 2,869,423 | Hoge et al. | Jan. 20, 1959 |
| 2,970,518 | Ross | Feb. 7, 1961 |
| 3,066,569 | MacDonald | Dec. 4, 1962 |

FOREIGN PATENTS

| | | |
|---|---|---|
| 1,111,830 | France | Nov. 2, 1955 |